(12) United States Patent
Wakabayashi

(10) Patent No.: US 7,082,304 B2
(45) Date of Patent: Jul. 25, 2006

(54) RADIO COMMUNICATION SYSTEM, BASE STATION DEVICE, MOBILE TERMINAL DEVICE, AND RADIO LINK SWITCHING METHOD

(75) Inventor: Hideji Wakabayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/513,326

(22) PCT Filed: Jun. 5, 2002

(86) PCT No.: PCT/JP02/05539

§ 371 (c)(1),
(2), (4) Date: Nov. 10, 2004

(87) PCT Pub. No.: WO03/105518

PCT Pub. Date: Dec. 18, 2003

(65) Prior Publication Data

US 2005/0164706 A1    Jul. 28, 2005

(51) Int. Cl.
*H04Q 7/20* (2006.01)
*H04Q 7/00* (2006.01)

(52) U.S. Cl. .............. 455/441; 455/442; 455/444; 455/436; 370/331; 370/332

(58) Field of Classification Search .............. 455/441, 455/442, 436, 444, 439; 370/331, 332
See application file for complete search history.

(56) References Cited

U.S. PATENT DOCUMENTS

| | | | | |
|---|---|---|---|---|
| 5,548,806 A | * | 8/1996 | Yamaguchi et al. | 455/441 |
| 6,035,210 A | * | 3/2000 | Endo et al. | 455/522 |
| 6,212,381 B1 | * | 4/2001 | Oda | 455/441 |
| 6,400,953 B1 | * | 6/2002 | Furukawa | 455/442 |
| 6,577,868 B1 | * | 6/2003 | Vialen et al. | 455/441 |
| 6,701,164 B1 | * | 3/2004 | Yamaguchi et al. | 455/562.1 |
| 2001/0006514 A1 | * | 7/2001 | Park | 370/331 |
| 2003/0064729 A1 | * | 4/2003 | Yamashita | 455/451 |

FOREIGN PATENT DOCUMENTS

| | | |
|---|---|---|
| JP | 5259969 | 10/1993 |
| JP | 6069859 | 3/1994 |
| JP | 9-284826 | 10/1997 |
| JP | 11-127469 | 5/1999 |
| JP | 11-252613 | 9/1999 |
| JP | 11266262 | 9/1999 |
| JP | 2000-244962 | 9/2000 |
| JP | 2001-60932 | 3/2001 |
| JP | 2001-238239 | 8/2001 |

* cited by examiner

*Primary Examiner*—George Eng
*Assistant Examiner*—Kiet Doan
(74) *Attorney, Agent, or Firm*—Oblon, Spivak, McClelland, Maier & Neustadt, P.C.

(57) ABSTRACT

A terminal 100 detects a moving speed of the terminal 100 and discriminates if it is necessary to switch a radio link between a radio link 102 without soft handover and a radio link 103 with soft handover, when it is necessary to switch the radio link, a request to switch states with/without soft handover 106 is sent to a base station 101, the base station 101 switches the states with/without soft handover based on the request to switch states with/without soft handover 106, in addition, an instruction to switch states with/without soft handover 107 is sent to the terminal 100, and the terminal 100 switches the states with/without soft handover based on the instruction to switch states with/without soft handover 107.

15 Claims, 12 Drawing Sheets

RADIO COMMUNICATION SYSTEM, BASE STATION DEVICE, MOBILE TERMINAL DEVICE, AND RADIO LINK SWITCHING METHOD

TECHNICAL FIELD

The present invention relates to technique for switching states with/without soft handover in mobile communication.

BACKGROUND ART

As an example of packet communication in the conventional mobile communication, for instance, there is shown in the Japanese unexamined patent publication 2001-60932, "Dynamic Channel Assigning Method and Device for Asynchronous Mobile Communication System."

In packet communication in this conventional mobile communication system, a channel for packet communication is selected between shared channel packet communication which is suitable to low traffic and individual channel packet communication which is suitable to high traffic according to amount of data to be transmitted.

In the packet communication in the conventional mobile communication system, the selection is done according to amount of data to be transmitted between the shared channel packet communication and the individual channel packet communication.

However, switching states with/without soft handover is not carried out, considering moving speed of a terminal or variation of transmission environment in the packet communication in the conventional mobile communication system, so that trials of communication are kept in a while even if the quality becomes low, and accordingly, there occurs unnecessary interference.

In a CDMA system, etc., an individual channel includes a function of soft-handover which composes signals of multiple base stations, so that it is possible to increase the quality even if the transmission path is obstructed because of shadowing, etc. such that a moving object enters into shadow of buildings. Therefore, the system is suitable to the movement at a high speed.

When a moving object does not move at a high speed and is located near a specific base station, and thus it is possible to make secure communication, it is preferable to avoid using soft handover, since interference amount can be reduced and the radio resource can be used more effectively.

In general, a shared channel is seldom provided with soft handover function; it is possible for an individual channel to avoid using soft handover when sufficient quality has been already obtained.

On the other hand, when the communication involves drastic changes in transmission environment such as movement at a high speed, it is preferable to switch to state with soft handover in order to secure the quality.

However, the possibility is high to occupy the radio resource in the state with soft handover compared with the state without soft handover, and it is desirable to switch to the state without soft handover if sufficient quality can be secured in the state without soft handover.

It is one of objects of the present invention to provide a radio communication system in which the radio resource can be used effectively by discriminating switching states with/without soft handover, considering moving speed and variation of transmission environment.

DISCLOSURE OF THE INVENTION

According to the present invention, in a radio communication system in which a plurality of radio links are provided and which includes a base station device and a mobile terminal device conducting data communication using one of the plurality of radio links, the base station device and the mobile terminal device carry out switching a radio link used for the data communication based on a moving speed of the mobile terminal device.

The mobile terminal device detects a moving speed of the mobile terminal device itself, discriminates if it is necessary to switch from the radio link which is currently used to another radio link based on the moving speed detected of the mobile terminal device itself, and sends a switching request to switch the radio link which is currently used to another radio link when it is necessary to switch to another radio link, the base station device when the switching request is received from the mobile terminal device, switches the radio link used for the data communication from the radio link which is currently used to another radio link, and sends a switching instruction to switch the radio link used for the data communication to the mobile terminal device, and the mobile terminal device when the switching instruction is received from the base station device, switches the radio link used for the data communication from the radio link which is currently used to another radio link.

As the plurality of radio links, a radio link adaptive to soft handover which is adaptive to soft handover and a radio link nonadaptive to soft handover which is nonadaptive to soft handover are provided between the base station device and the mobile terminal device, the mobile terminal device checks if the moving speed detected of the mobile terminal device itself is equal to or greater than a predetermined threshold value or not, and discriminates whether the radio link which is currently used is the radio link adaptive to soft handover or the radio link nonadaptive to soft handover; when the moving speed detected of the mobile terminal device itself is equal to or greater than the predetermined threshold value and the radio link which is currently used is the radio link nonadaptive to soft handover, sends a switching request to radio link adaptive to soft handover to request to switch to the radio link adaptive to soft handover from the radio link nonadaptive to soft handover to the base station device; and when the moving speed detected of the mobile terminal device itself is less than the predetermined threshold value and the radio link which is currently used is the radio link adaptive to soft handover, sends a switching request to radio link nonadaptive to soft handover to request to switch to the radio link nonadaptive to soft handover from the radio link adaptive to soft handover to the base station device, the base station device when the switching request to radio link adaptive to soft handover is received from the mobile terminal device, switches the radio link used for the data communication from the radio link nonadaptive to soft handover to the radio link adaptive to soft handover, and sends a switching instruction to radio link adaptive to soft handover to instruct to switch the radio link used for the data communication from the radio link nonadaptive to soft handover to the radio link adaptive to soft handover to the mobile terminal device; and when the switching request to radio link nonadaptive to soft handover is received from the mobile terminal device, switches the radio link used for the data communication from the radio link adaptive to soft handover to the radio link nonadaptive to soft handover, and sends a switching instruction to radio link nonadaptive to soft handover to instruct to switch the radio link used for the data communication from the radio link adaptive to soft handover to the radio link nonadaptive to soft handover to the mobile terminal device, and the mobile terminal device when the switching request to radio link adaptive to soft handover is received from the base station device, switches the radio link used for the data communication from the radio link nonadaptive to soft handover to the radio link adaptive to soft handover; and when the switching request to radio link nonadaptive to soft handover is received from the base station device, switches the radio link used for the data communication from the radio link adaptive to soft handover to the radio link nonadaptive to soft handover.

The mobile terminal device detects the moving speed of the mobile terminal device itself, and sends moving speed information showing the moving speed detected of the mobile terminal device to the base station device, the base station device receives the moving speed information from the mobile terminal device; discriminates if it is necessary to switch from the radio link which is currently used to another radio link based on the moving speed of the mobile terminal device shown in the moving speed information received; and when it is necessary to switch to another radio link, switches the radio link used for the data communication from the radio link which is currently used to another radio link, and sends a switching instruction to instruct to switch the radio link used for the data communication to the mobile terminal device, and the mobile terminal device when the switching instruction is received from the base station, switches the radio link used for the data communication from the radio link which is currently used to another radio link.

As the plurality of radio links, a radio link adaptive to soft handover which is adaptive to soft handover and a radio link nonadaptive to soft handover which is nonadaptive to soft handover are provided between the base station device and the mobile terminal device, the base station device when the moving speed information is received from the mobile terminal device, checks if the moving speed of the mobile terminal device shown in the moving speed information is equal to or greater than a predetermined threshold value or not, and discriminates whether the radio link which is currently used is the radio link adaptive to soft handover or the radio link nonadaptive to soft handover; when the moving speed of the mobile terminal device is equal to or greater than the predetermined threshold value and the radio link which is currently used is the radio link nonadaptive to soft handover, switches the radio link used for the data communication from the radio link nonadaptive to soft handover to the radio link adaptive to soft handover, and sends a switching instruction to radio link adaptive to soft handover to instruct to switch the radio link used for the data communication from the radio link nonadaptive to soft handover to the radio link adaptive to soft handover to the mobile terminal device; and when the moving speed of the mobile terminal device is less than the predetermined threshold value and the radio link which is currently used is the radio link adaptive to soft handover, switches the radio link used for the data communication from the radio link adaptive to soft handover to the radio link nonadaptive to soft handover, and sends a switching instruction to radio link nonadaptive to soft handover to instruct to switch the radio link used for the data communication from the radio link adaptive to soft handover to the radio link nonadaptive to soft handover to the mobile terminal device, and the mobile terminal device when the switching instruction to radio link adaptive to soft handover is received from the base station device, switches the radio link used for the data communication from the radio link nonadaptive to soft handover to the radio link adaptive to soft handover; and when the switching instruction to radio link nonadaptive to soft handover is received from the base station device, switches the radio link used for the data communication from the radio link adaptive to soft handover to the radio link nonadaptive to soft handover.

According to the present invention, in a radio communication system in which a plurality of radio links are provided and which includes a base station device and a mobile terminal device conducting data communication using one of the plurality of radio links, the base station device and the mobile terminal device carry out switching a radio link used for the data communication based on communication quality of a radio link which is currently used.

The mobile terminal device measures communication quality of the radio link which is currently used, and sends communication quality information showing the communication quality measured to the base station device, the base station device receives the communication quality information from the mobile terminal device; estimates a moving speed of the mobile terminal device based on the communication quality shown in the communication quality information received; discriminates if it is necessary to switch from the radio link which is currently used to another radio link based on the moving speed estimated of the mobile terminal device; and when it is necessary to switch to another radio link, switches the radio link used for the data communication from the radio link which is currently used to another radio link, and sends a switching instruction to instruct to switch the radio link used for the data communication to the mobile terminal device, and the mobile terminal device when the switching instruction is received from the base station device, switches the radio link used for the data communication from the radio link which is currently used to another radio link.

As the plurality of radio links, a radio link adaptive to soft handover and a radio link nonadaptive to soft handover are provided between the base station device and the mobile terminal device, the base station device when the moving speed of the mobile terminal device is estimated based on the communication quality shown in the communication quality information; checks if the moving speed estimated of the mobile terminal device is equal to or greater than a predetermined threshold value or not, and discriminates whether the radio link which is currently used is the radio link adaptive to soft handover or the radio link nonadaptive to soft handover; when the moving speed estimated is equal to or greater than the predetermined threshold value and the radio link which is currently used is the radio link nonadaptive to soft handover, switches the radio link used for the data communication from the radio link nonadaptive to soft handover to the radio link adaptive to soft handover, and sends a switching instruction to radio link adaptive to soft handover to instruct to switch the radio link used for the data communication from the radio link nonadaptive to soft handover to the radio link adaptive to soft handover to the mobile terminal device; and when the moving speed estimated is less than the predetermined threshold value and the radio link which is currently used is the radio link adaptive to soft handover, switches the radio link used for the data communication from the radio link adaptive to soft handover to the radio link nonadaptive to soft handover, and sends a switching instruction to radio link nonadaptive to soft handover to instruct to switch the radio link used for the data communication from the radio link adaptive to soft handover to the radio link nonadaptive to soft handover to the mobile terminal device, and the mobile terminal device when the switching instruction to radio link adaptive to soft handover is received from the base station device, switches the radio link used for the data communication from the radio link nonadaptive to soft handover to the radio link adaptive to soft handover; and when the switching instruction to radio link nonadaptive to soft handover is received from the base station device, switches the radio link used for the data communication from the radio link adaptive to soft handover to the radio link nonadaptive to soft handover.

The base station device measures the communication quality of the radio link which is currently used; estimates a moving speed of the mobile terminal device based on measurement result; discriminates if it is necessary to switch from the radio link which is currently used to another radio link based on the moving speed estimated of the mobile terminal device; and when it is necessary to switch to another radio link, switches the radio link used for the data communication from the radio link which is currently used to another radio link, and sends a switching instruction to instruct to switch the radio link used for the data communication to the mobile terminal device, and the mobile terminal device when the switching instruction is received from the base station device, switches the radio link used for the data communication from the radio link which is currently used to another radio link.

As the plurality of radio links, a radio link adaptive to soft handover which is adaptive to soft handover and a radio link nonadaptive to soft handover which is nonadaptive to soft handover are provided between the base station device and the mobile terminal device, the base station device when the moving speed of the mobile terminal device is estimated, checks if the moving speed estimated of the mobile terminal device is equal to or greater than a predetermined threshold value or not, and discriminates whether the radio link which is currently used is the radio link adaptive to soft handover or the radio link nonadaptive to soft handover; when the moving speed estimated is equal to or greater than the predetermined threshold value and the radio link which is currently used is the radio link nonadaptive to soft handover, switches the radio link used for the data communication from the radio link nonadaptive to soft handover to the radio link adaptive to soft handover, and sends a switching instruction to radio link adaptive to soft handover to instruct to switch the radio link used for the data communication from the radio link nonadaptive to soft handover to the radio link adaptive to soft handover to the mobile terminal device; and when the moving speed estimated is less than the predetermined threshold value and the radio link which is currently used is the radio link adaptive to soft handover, switches the radio link used for the data communication from the radio link adaptive to soft handover to the radio link nonadaptive to soft handover, and sends a switching instruction to radio link nonadaptive to soft handover to instruct to switch the radio link used for the data communication from the radio link adaptive to soft handover to the radio link nonadaptive to soft handover to the mobile terminal device, and the mobile terminal device when the switching instruction to radio link adaptive to soft handover is received from the base station device, switches the radio link used for the data communication from the radio link nonadaptive to soft handover to the radio link adaptive to soft handover; and when the switching instruction to radio link nonadaptive to soft handover is received from the base station device, switches the radio link used for the data communication from the radio link adaptive to soft handover to the radio link nonadaptive to soft handover.

According to the present invention, a base station device which carries out data communication with a mobile terminal device using one of a plurality of radio links out of the plurality of radio links provided between the base station device and the mobile terminal device, the base station device switches a radio link used for the data communication with the mobile terminal device based on a moving speed of the mobile terminal device.

The mobile terminal device detects a moving speed of the mobile terminal device itself, discriminates if it is necessary to switch from the radio link which is currently used to another radio link based on the moving speed detected of the mobile terminal device itself, and when it is necessary to switch to another radio link, is able to send a switching request to request to switch from the radio link which is currently used to another radio link to the base station device, the base station device includes: a communicating unit for receiving the switching request from the mobile terminal device; a radio link switching unit for switching the radio link used for the data communication with the mobile terminal device from the radio link which is currently used to another radio link based on the switching request received by the communicating unit; and a switching instruction generating unit for generating a switching instruction to instruct the mobile terminal device to switch the radio link used for the data communication when the radio link switching unit switches the radio link, and sending the switching instruction generated to the mobile terminal device through the communicating unit.

The mobile terminal device detects the moving speed of the mobile terminal device itself, and is able to send moving speed information showing the moving speed detected of the mobile terminal device itself to the base station device, the base station device includes: a communicating unit for receiving the moving speed information from the mobile terminal device; a switching discriminating unit for discriminating if it is necessary to switch from the radio link which is currently used to another radio link based on the moving speed of the mobile terminal device shown in the moving speed information; a radio link switching unit for switching the radio link used for the data communication with the mobile terminal device from the radio link which is currently used to another radio link when the switching discriminating unit discriminates it is necessary to switch from the radio link which is currently used to another radio link; and a switching instruction generating unit for generating a switching instruction to instruct the mobile terminal device to switch the radio link used for the data communication, and sending the switching instruction generated to the mobile terminal device through the communicating unit.

According to the present invention, a base station device which carries out data communication with a mobile terminal device using one of a plurality of radio links out of the plurality of radio links provided between the base station device and the mobile terminal device, the base station device switches a radio link used for the data communication with the mobile terminal device based on communication quality of a radio link which is currently used.

The mobile terminal device measures the communication quality of the radio link which is currently used, and is able to send communication quality information showing the communication quality measured to the base station device, and the base station device includes: a communicating unit for receiving the communication quality information from the mobile terminal device; a moving speed estimating unit for estimating a moving speed of the mobile terminal device based on the communication quality shown in the communication quality information; a switching discriminating unit for discriminating if it is necessary to switch from the radio link which is currently used to another radio link based on the moving speed estimated of the mobile terminal device estimated by the moving speed estimating unit; a radio link switching unit for switching the radio link used for the data communication from the radio link which is currently used to another radio link when the switching discriminating unit discriminates it is necessary to switch from the radio link which is currently used to another radio link; and a switching instruction generating unit for generating a switching instruction to instruct the mobile terminal device to switch the radio link used for the data communication when the radio link switching unit switches the radio link, and sending the switching instruction generated to the mobile terminal device through the communicating unit.

The base station device includes: a communication quality measuring unit for measuring the communication quality of the radio link which is currently used; a moving speed estimating unit for estimating a moving speed of the mobile terminal device based on measurement result by the communication quality measuring unit; a switching discriminating unit for discriminating if it is necessary to switch from the radio link which is currently used to another radio link based on the moving speed estimated of the mobile terminal device estimated by the moving speed estimating unit; a radio link switching unit for switching the radio link used for the data communication from the radio link which is currently used to another radio link when the switching discriminating unit discriminates it is necessary to switch from the radio link which is currently used to another radio link; and a switching instruction generating unit for generating a switching instruction to instruct the mobile terminal device to switch the radio link used for the data communication when the radio link switching unit switches the radio link, and sending the switching instruction generated to the mobile terminal device through the communicating unit.

According to the present invention, a mobile terminal device which carries out data communication with a base station device using one of a plurality of radio links out of the plurality of radio links provided between the base station device and the mobile terminal device, the mobile terminal device switches a radio link used for the data communication with the base station device based on a moving speed of the mobile terminal device itself.

The mobile terminal device includes: a moving speed detecting unit for detecting a moving speed of the mobile terminal device itself; a switching request discriminating unit for discriminating if it is necessary to switch from a radio link which is currently used to another radio link based on the moving speed detected of the mobile terminal device itself by the moving speed detecting unit, and when it is necessary to switch to another radio link, generating a switching request to request to switch from the radio link which is currently used to another radio link; a communicating unit for sending the switching request generated by the switching request discriminating unit to the base station device, and receiving a switching instruction to instruct to switch the radio link used for the data communication from the base station device; and a radio link switching unit for switching the radio link used for the data communication from the radio link which is currently used to another radio link based on the switching instruction received by the communicating unit.

The mobile terminal device includes: a moving speed detecting unit for detecting a moving speed of the mobile terminal device itself; a communicating unit for sending moving speed information showing the moving speed detected of the mobile terminal device itself by the moving speed detecting unit to the base station device, and in a specified case, receiving a switching instruction to instruct to switch the radio link used for the data communication from the base station device; and a radio link switching unit for switching the radio link used for the data communication from the radio link which is currently used to another radio link based on the switching instruction received by the communicating unit.

According to the present invention, a mobile terminal device which carries out data communication with a base station device using one of a plurality of radio links out of the plurality of radio links provided between the base station device and the mobile terminal device, the mobile terminal device switches a radio link used for the data communication with the base station device based on communication quality of a radio link which is currently used.

The mobile terminal device includes: a communication quality measuring unit for measuring communication quality of the radio link which is currently used; a communicating unit for sending communication quality information showing the communication quality measured by the communication quality measuring unit to the base station unit, and in a specified case, receiving a switching instruction to instruct to switch the radio link used for the data communication from the base station device; and a radio link switching unit for switching the radio link used for the data communication from the radio link which is currently used to another radio link based on the switching instruction received by the communicating unit.

According to the present invention, a radio link switching method for switching a radio link used for data communication between a base station device and a mobile terminal device, the method includes switching the radio link used for the data communication between the base station device and the mobile terminal device based on a moving speed of the mobile terminal device.

According to the present invention, a radio link switching method for switching a radio link used for data communication between a base station device and a mobile terminal device, the method includes switching the radio link used for the data communication between the base station device and the mobile terminal device based on communication quality of a radio link which is currently used between the base station device and the mobile terminal device.

PREFERRED EMBODIMENTS FOR CARRYING OUT THE INVENTION

Embodiment 1

Hereinafter, the first embodiment of the present invention will be explained in reference to the drawings.

Figure 1:
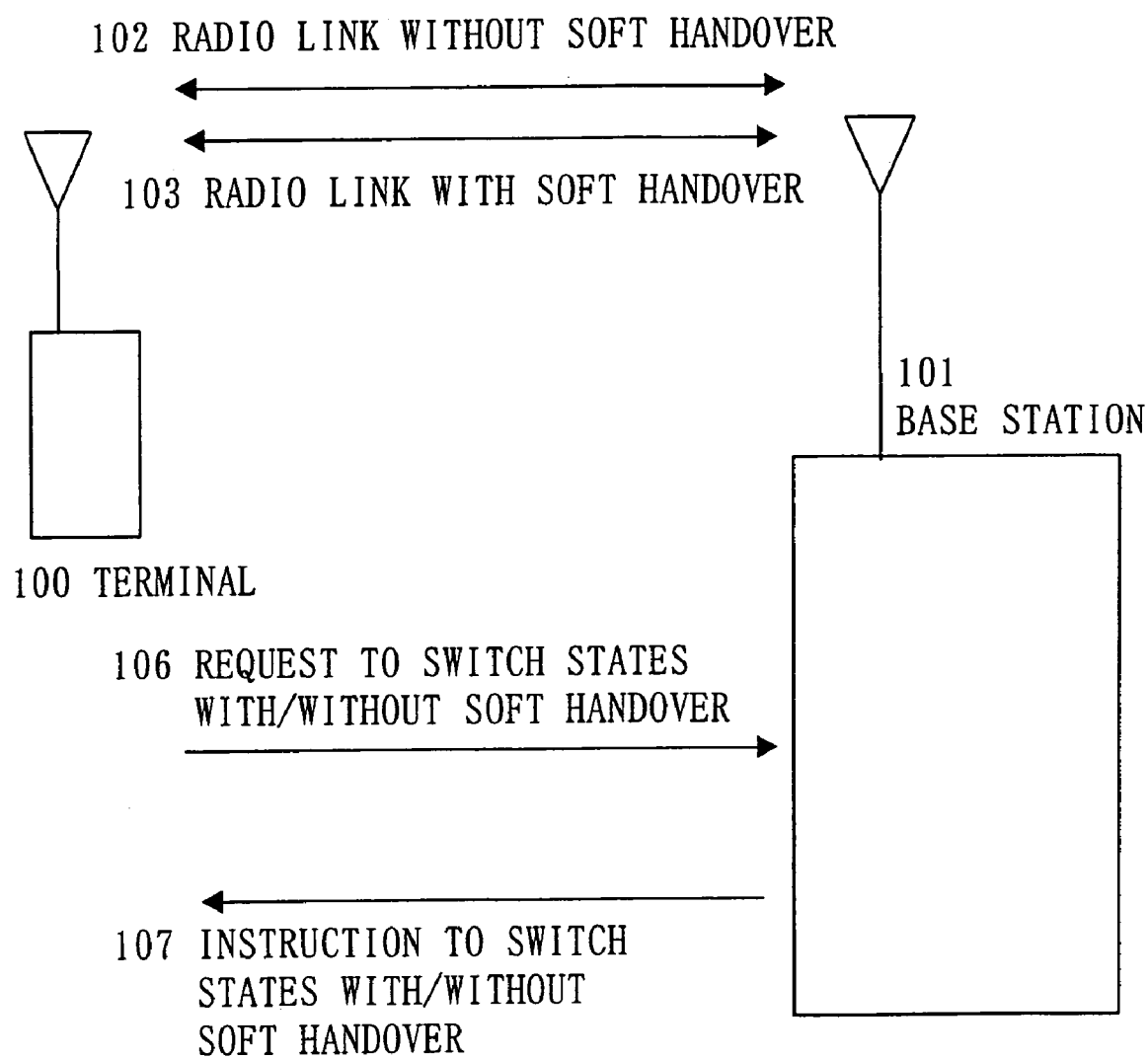
FIG. 1 shows a general configuration of a mobile communication system according to a first embodiment.

FIG. 1 shows a general configuration of a mobile communication system (a radio communication system) according to the present embodiment.

Between a terminal 100 and a base station 101, there are two states of a radio link 102 without soft handover and a radio link 103 with soft handover, and the two states can be switched.

A base station sometimes has a configuration of plural devices such as a W-CDMA system which includes Node-B provided at a terminal of the base station system and an RNC (Radio Network Controller); however, the base station here means a whole configuration that is necessary to implement these functions as a base station.

The terminal 100 is an example of a mobile terminal device; the base station 101 is an example of a base station device. Further, the radio link 102 without soft handover corresponds to a radio link nonadaptive to soft handover; the radio link 103 corresponds to a radio link adaptive to soft handover.

As a signal from the terminal 100 to the base station 101, there is a request to switch states with/without soft handover 106. On the other hand, as a signal from the base station 101 to the terminal 100, there is an instruction to switch states with/without soft handover 107. In the following, the request to switch states with/without soft handover 106 is also simply referred to as a switching request, and the instruction to switch states with/without soft handover 107 is also referred to as a switching instruction.

In an actual communication system, a switching method for states with/without soft handover depends on a switching function for states with/without soft handover that the system specifically contains. Concretely, two cases can be considered: one is switching states with/without soft handover in the same channel (for example, in an individual channel); and the other is switching states with/without soft handover by changing channels of different kinds (for example, an individual channel and a shared channel). The following explanation includes both cases.

Figure 2:
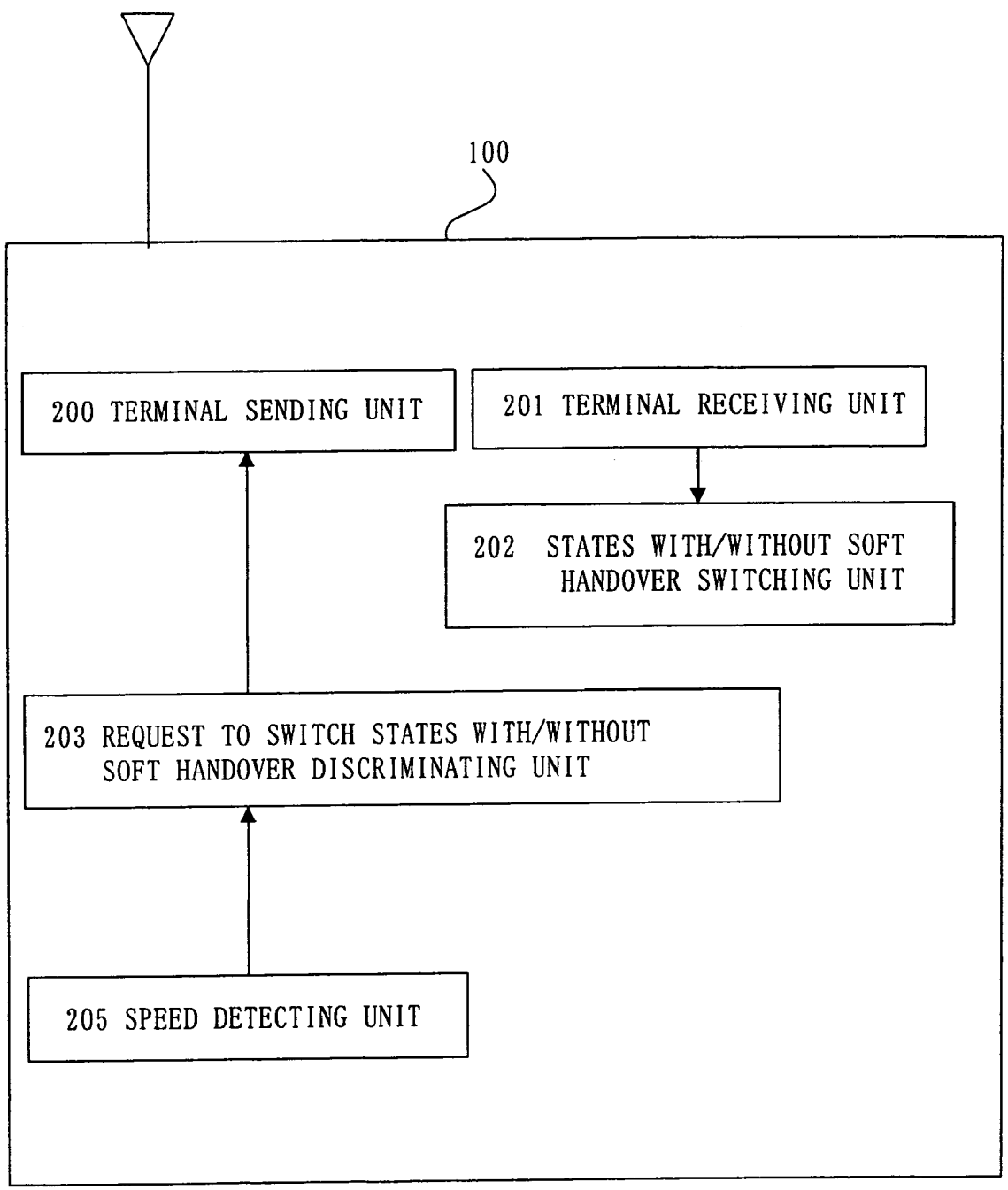
FIG. 2 shows an internal principle diagram of a terminal according to the first embodiment.

FIG. 2 shows an internal principle diagram of the terminal 100 according to this embodiment.

The terminal 100 includes a terminal sending unit 200 and a terminal receiving unit 201.

A states with/without soft handover switching unit 202 conducts switching process of states with/without soft handover of the terminal based on the instruction to switch states with/without soft handover received from the terminal receiving unit 201.

A request to switch states with/without soft handover discriminating unit 203 conducts discrimination of necessity for switching states with/without soft handover based on the moving speed of the terminal, and when switching is necessary, the request to switch states with/without soft handover discriminating unit 203 generates the request to switch states with/without soft handover 106. The request to switch states with/without soft handover is sent from the terminal sending unit 200.

A speed detecting unit 205 detects the moving speed of the terminal.

In the present embodiment, the terminal sending unit 200 and the terminal receiving unit 201 correspond to a communicating unit, the states with/without soft handover switching unit 202 corresponds to a radio link switching unit, the request to switch states with/without soft handover discriminating unit 203 corresponds to a switching discriminating unit, and the speed detecting unit corresponds to a moving speed detecting unit.

Figure 3:
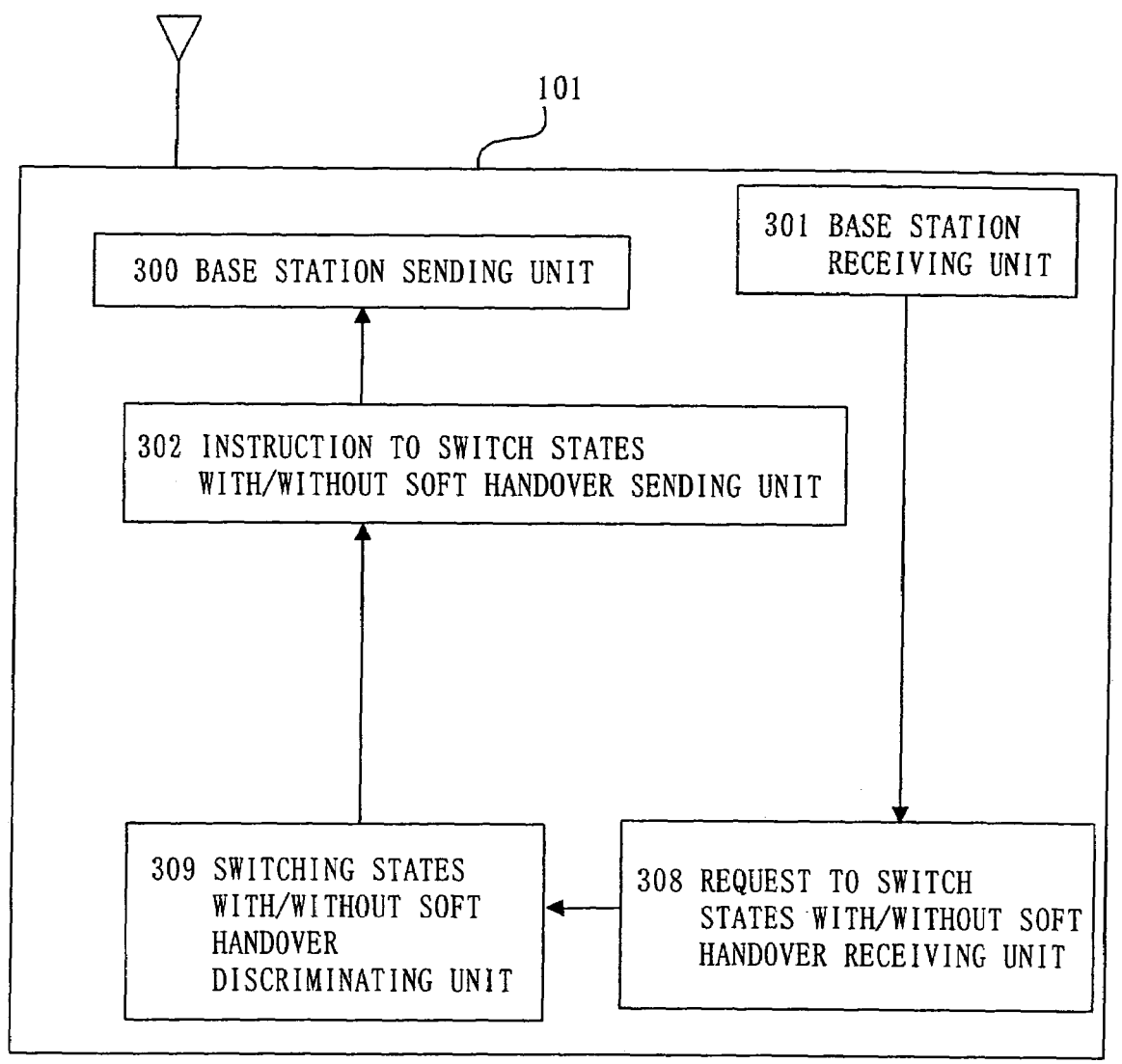
FIG. 3 shows an internal principle diagram of a base station according to the first embodiment.

FIG. 3 shows an internal principle diagram of the base station 101 according to this embodiment.

The base station 101 includes a base station sending unit 300 and a base station receiving unit 301.

A instruction to switch states with/without soft handover sending unit 302 generates an instruction to switch states with/without soft handover for the terminal and sends the instruction from the base station sending unit 300.

A request to switch states with/without soft handover receiving unit 308 receives the switching request sent from the terminal.

A switching states with/without soft handover discriminating unit 309 conducts switching process of states with/without soft handover based on the switching request.

Here, in this embodiment, the base station sending unit 300 and the base station receiving unit 301 correspond to a communicating unit, the instruction to switch states with/without soft handover sending unit 302 corresponds to a switching instruction generating unit, and the switching states with/without soft handover discriminating unit 309 corresponds to a radio link switching unit.

Next, a method and procedures for discrimination of switching states with/without soft handover according to this embodiment will be explained.

In the present embodiment, the terminal detects the moving speed of itself, discriminates the necessity of switching using the detected speed, sends a switching request to the base station when the switching is necessary, and the base station, on receiving the request, conducts switching the states with/without soft handover (switches the radio link 102 without soft handover and the radio link 103 with soft handover).

Figure 4:
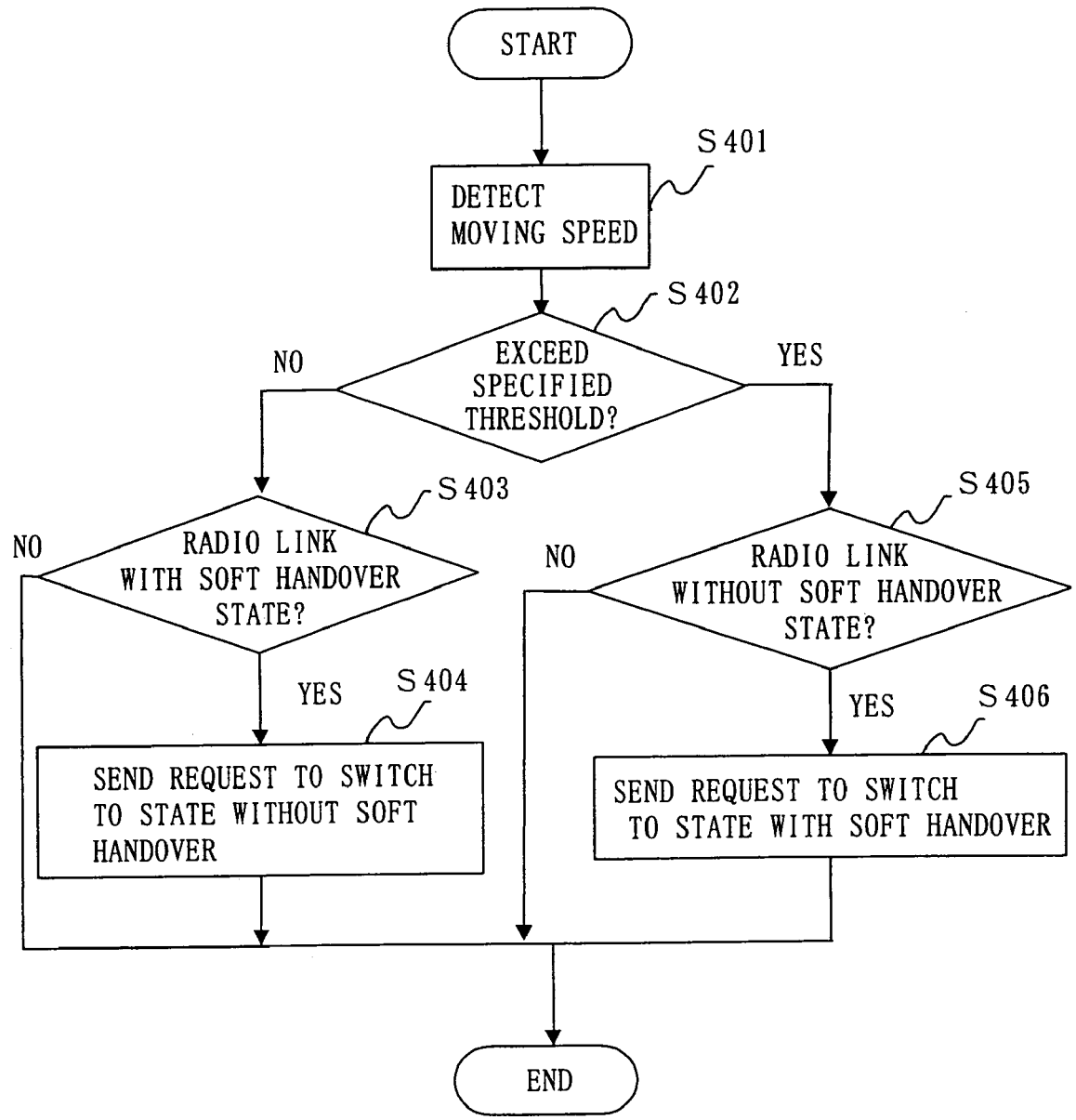
FIG. 4 is a flowchart showing switching process according to the first embodiment.

FIG. 4 is a flowchart showing a procedure of the terminal according to the present embodiment.

In the terminal, at step S401 the speed detecting unit 205 detects the moving speed of the terminal. As a method for detecting the speed, it is considered of one that employs Doppler shift Δf, one that obtains from a difference of location information such as GPS, etc. Here, a method which is provided as a function of the terminal is used regardless of its kind.

At step S402, the request to switch states with/without soft handover discriminating unit 203 discriminates if the moving speed of the terminal exceeds a specified threshold value or not. Here, this threshold value can include hysteresis to prevent chattering around the border.

When the moving speed of the terminal is slower than the threshold value (less than the threshold value), the operation proceeds to step S403 and it is discriminated if the current radio link is the state with soft handover. If the link is the state with soft handover, the operation proceeds to step S404 and a switching request to the state without soft handover (a switching request to radio link nonadaptive to soft handover) is sent out. When the current radio link is the state without soft handover, the operation is finished as it is.

When the moving speed of the terminal is faster than the threshold value (equal to or greater than the threshold value), the operation proceeds to step S405 and it is discriminated if the current radio link is the state without soft handover. If the link is the state without soft handover, the operation proceeds to step S406 and a switching request to the state with soft handover (a switching request to radio link adaptive to soft handover) is sent out. When the current radio link is the state with soft handover, the operation is finished as it is.

The base station receives a request to switch states with/without soft handover sent from the terminal at the request to switch states with/without soft handover receiving unit 308 and transfers the request to the switching states with/without soft handover discriminating unit 309.

The switching states with/without soft handover discriminating unit 309, in the case of the switching request to the state with soft handover, if it is possible to assign the radio resource, carries out switching to the state with soft handover. On the other hand, in the case of the switching request to the state without soft handover, the switching states with/without soft handover discriminating unit 309 carries out switching to the state without soft handover.

When the switching states with/without soft handover discriminating unit 309 carries out switching from the state without soft handover to the state with soft handover, the instruction to switch states with/without soft handover sending unit 302 generates a switching instruction to instruct the terminal to switch to the state with soft handover and sends the instruction from the base station sending unit 300. On the other hand, when the switching states with/without soft handover discriminating unit 309 carries out switching from the state with soft handover to the state without soft handover, the instruction to switch states with/without soft handover sending unit 302 generates a switching instruction to instruct the terminal to switch to the state without soft handover and sends the instruction from the base station sending unit 300.

Then, the terminal 100 which receives the switching instruction sent from the base station 101 carries out switching process of the states with/without soft handover pursuant to the switching instruction.

According to the first embodiment, the terminal sends the request to switch states with/without soft handover only when it is necessary, so that it is possible to provide an effect to decrease upstream communication amount and also reduce interference.

Embodiment 2

Figure 5:
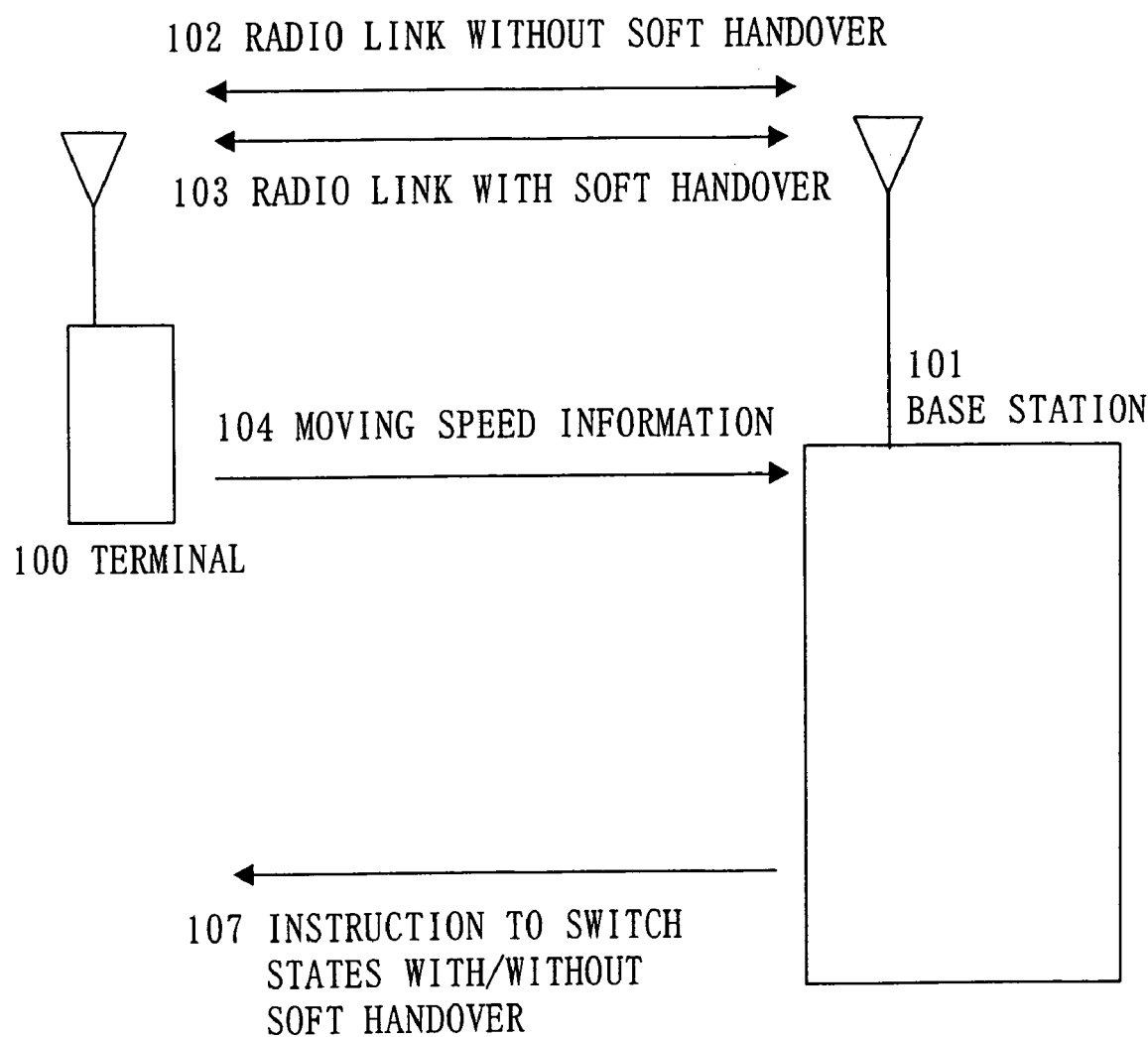
FIG. 5 shows a general configuration of a mobile communication system according to a second embodiment.

FIG. 5 shows a general configuration of a mobile communication system (a radio communication system) according to the present embodiment.

As well as FIG. 1, there are two states of the radio link without soft handover 102 and the radio link with soft handover 103 between the terminal 100 and the base station 101 and the two states can be switched.

In FIG. 5, moving speed information 104 is sent from the terminal 100 to the base station 101 instead of the request to switch states with/without soft handover 106.

Figure 6:
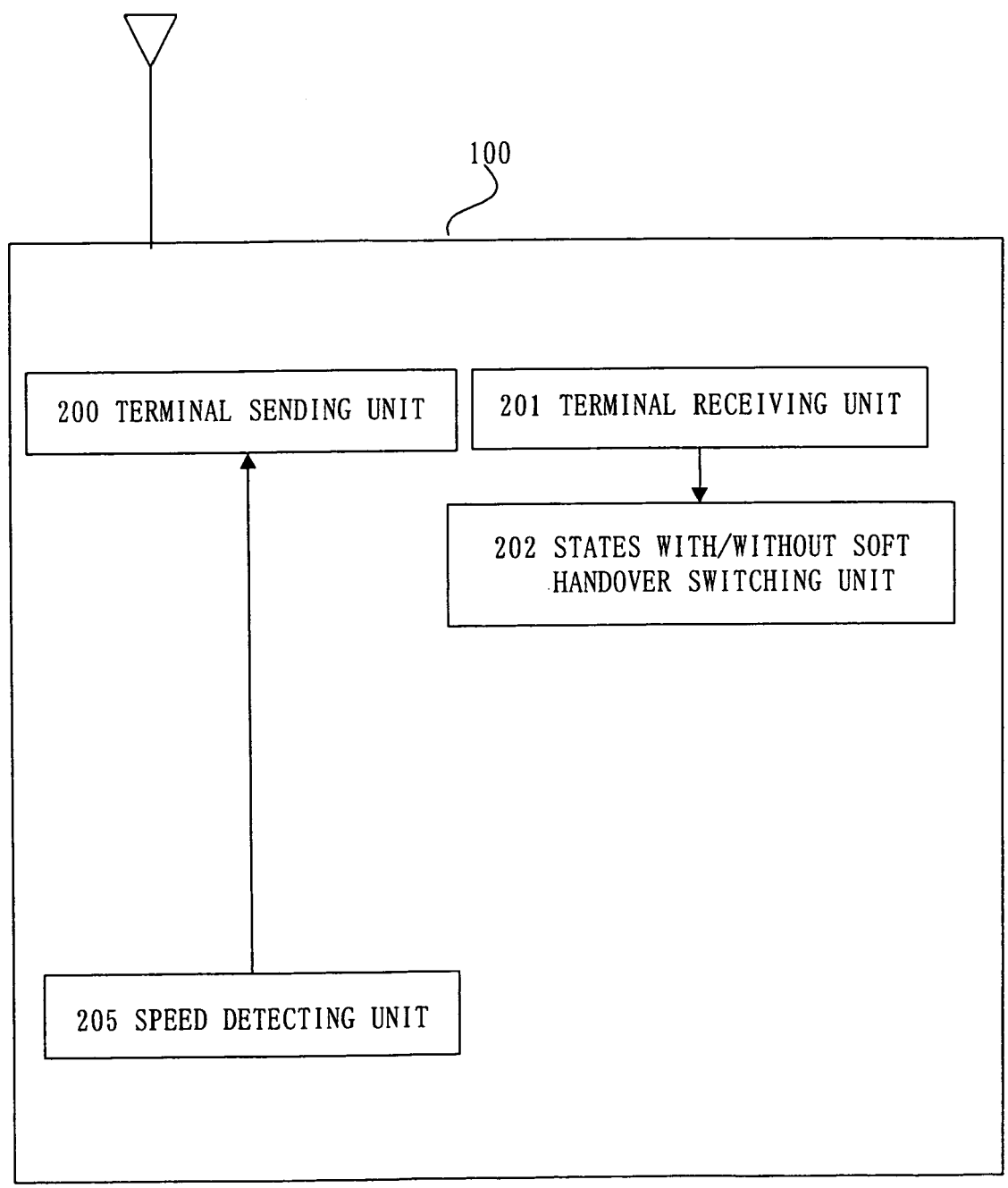
FIG. 6 shows an internal principle diagram of a terminal according to the second embodiment.

FIG. 6 shows an internal principle diagram of the terminal 100 according to the present embodiment.

FIG. 6 has a configuration that omits the request to switch states with/without soft handover discriminating unit 203 compared with that of FIG. 2.

Figure 7:
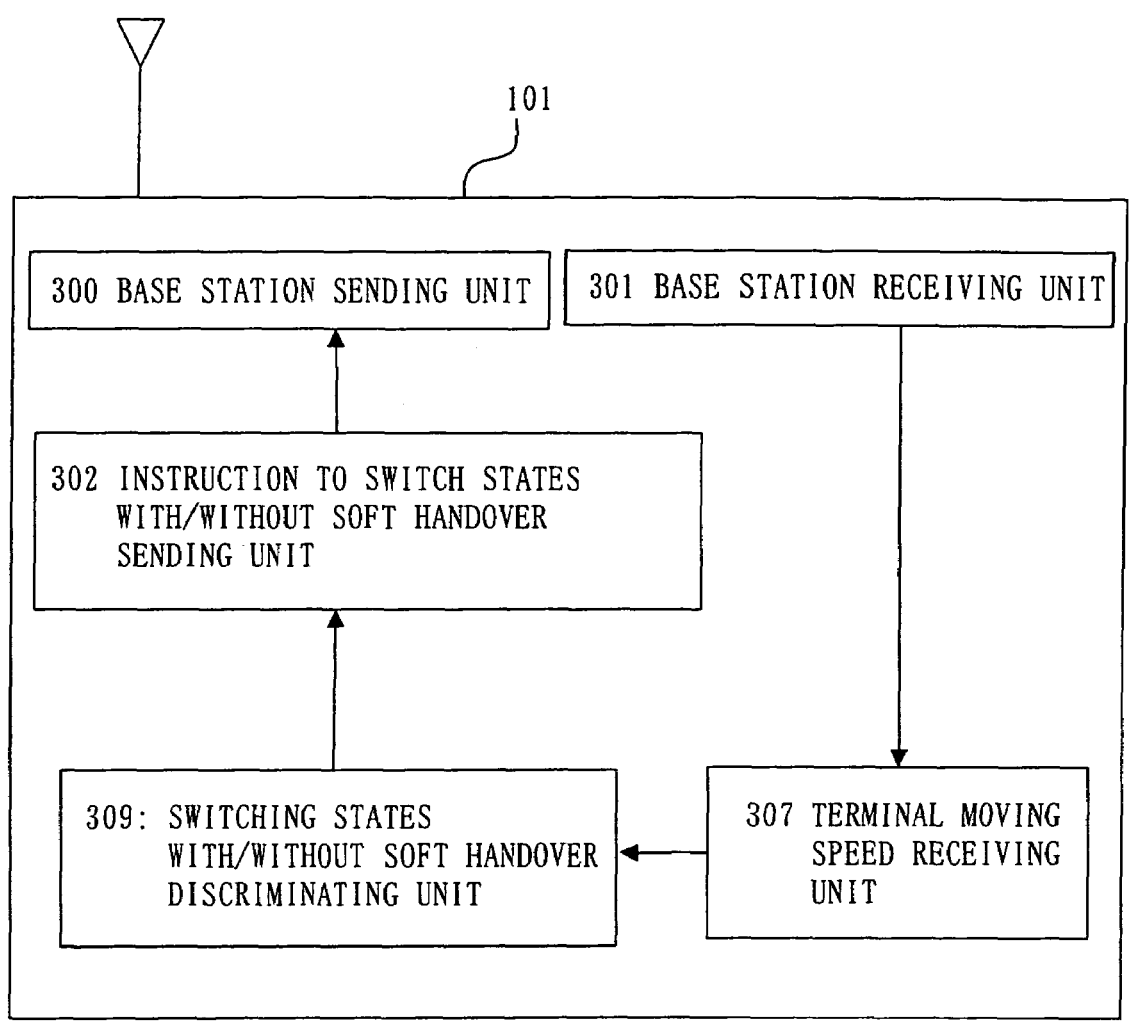
FIG. 7 shows an internal principle diagram of a base station according to the second embodiment.

FIG. 7 shows an internal principle diagram of the base station 101 according to the present embodiment.

FIG. 7 has the same configuration except that a terminal moving speed receiving unit 307 is provided instead of the request to switch states with/without soft handover receiving unit 308.

Here, in the present embodiment, the switching states with/without soft handover discriminating unit 309 corresponds to a switching discriminating unit and a radio link switching unit.

In this embodiment, the terminal periodically sends the moving speed information, and the base station receives the information and discriminates switching of states with/without soft handover. A discriminating method and its procedure for switching states with/without soft handover according to this embodiment will be explained.

The terminal detects its own speed using the speed detecting unit 205. The terminal sending unit 200 periodically sends the moving speed information 104 to the base station.

Figure 8:
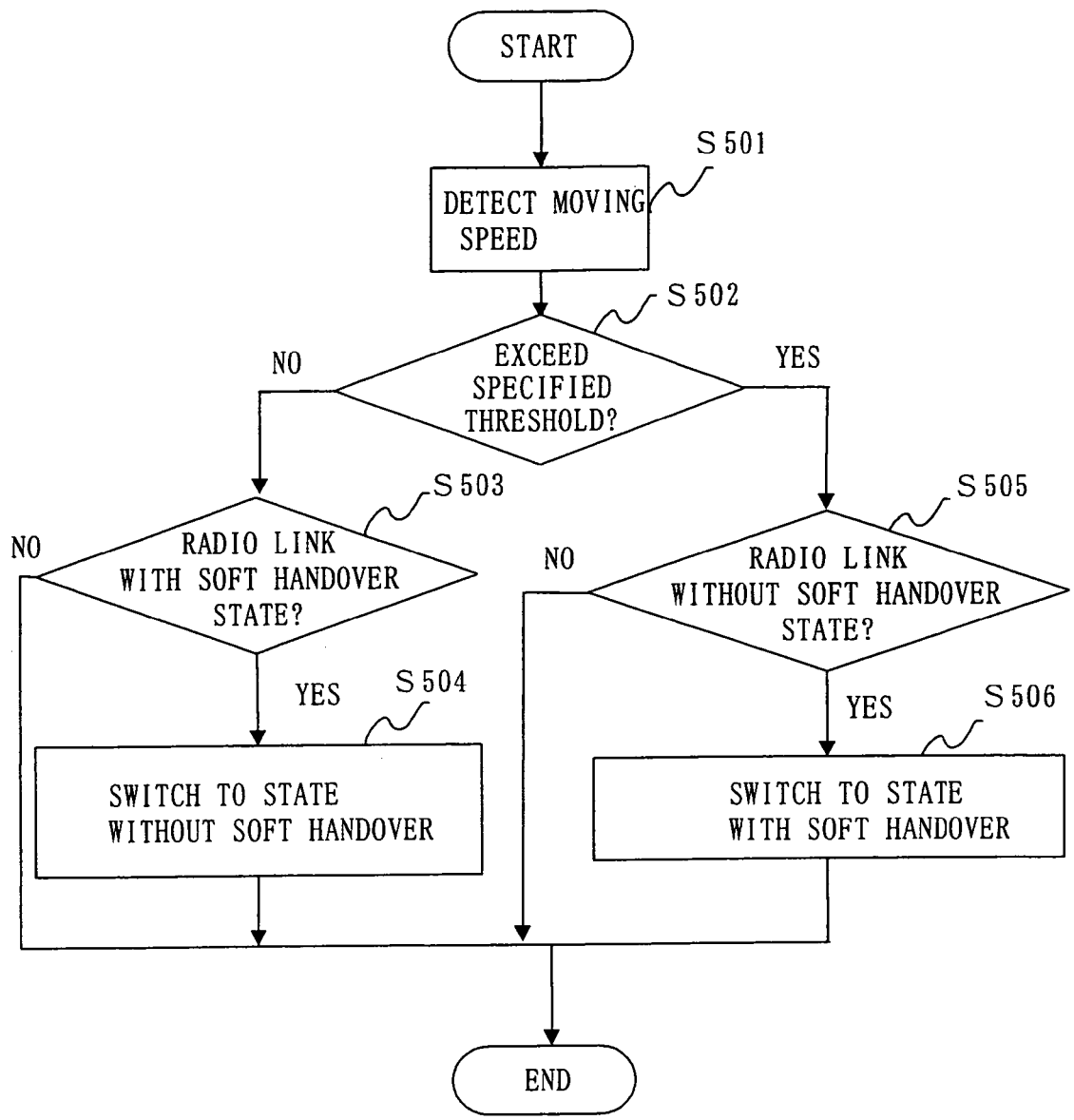
FIG. 8 is a flowchart showing switching process according to the second embodiment.

FIG. 8 is a flowchart showing procedure of the base station according to the present embodiment.

The base station receives the moving speed information 104 by the terminal moving speed receiving unit 307 at step S501, and at step S502 compares the speed with a threshold value by the switching states with/without soft handover discriminating unit 309. The moving speed of the terminal is compared with the threshold value which has been previously specified. When the moving speed of the terminal is slower than the threshold value (less than the threshold value), the operation proceeds to step S503 and it is checked if the current radio link is the state with soft handover. If it is the state with soft handover, switching is carried out to the state without soft handover, the operation proceeds to step S504, and the instruction to switch states with/without soft handover sending unit 302 generates and sends out an instruction to switch to the state without soft handover. If the current radio link is already the state without soft handover, the operation is finished as it is.

When the moving speed of the terminal is faster than the threshold value (equal to or greater than the threshold value), the operation proceeds to step S505 and it is checked if the current radio link is the state without soft handover. If it is the state without soft handover, switching is carried out to the state with soft handover, the operation proceeds to step S506, and the instruction to switch states with/without soft handover sending unit 302 generates and sends out an instruction to switch to the state with soft handover. If the current radio link is already the state with soft handover, the operation is finished as it is. The subsequent operation is the same as that has been explained in the embodiment.

According to the second embodiment, the base station discriminates switching of states with/without soft handover, so that it is expected to decrease the processing amount of the terminal.

Embodiment 3

Figure 9:
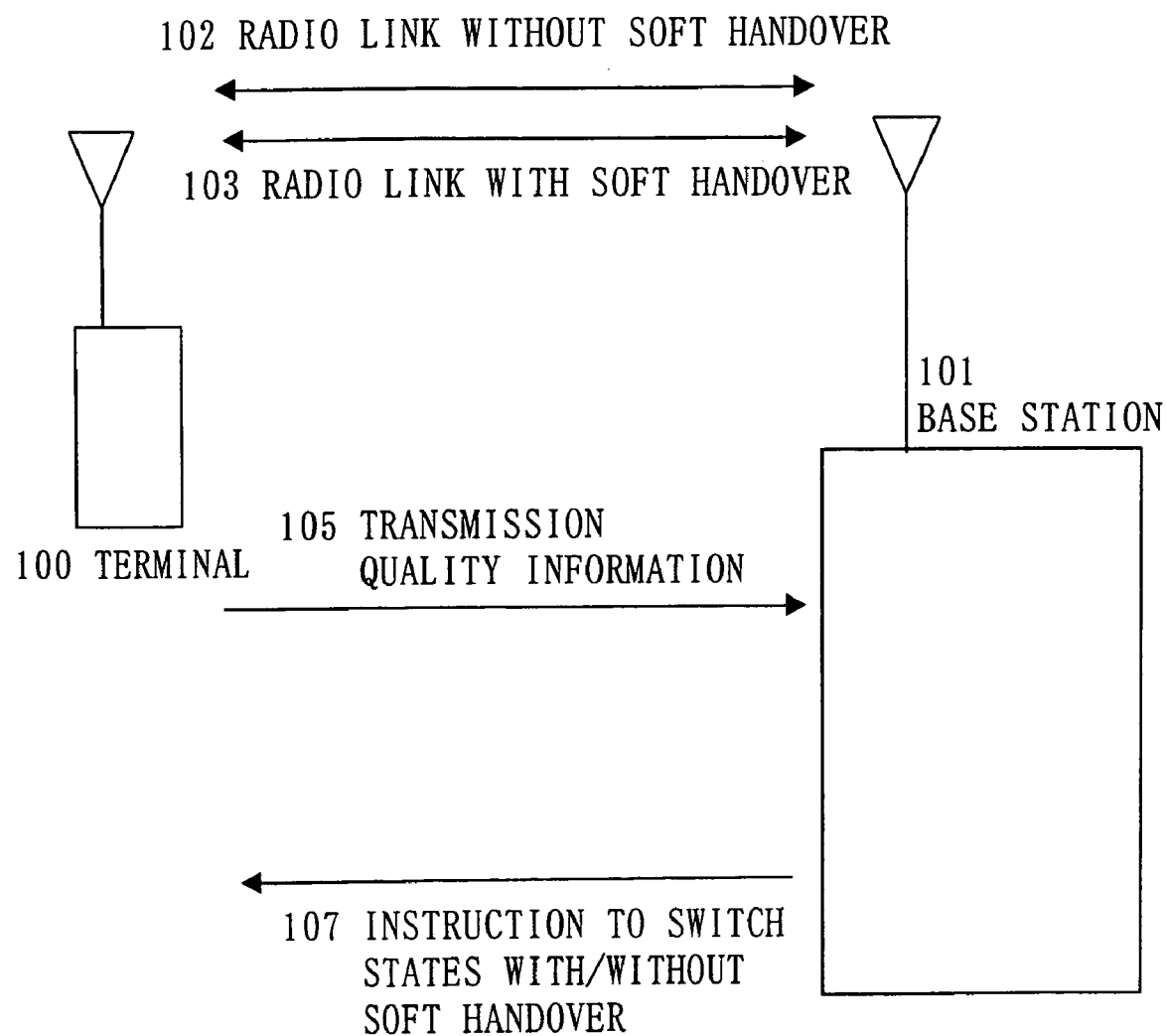
FIG. 9 shows a general configuration of a mobile communication system according to a third embodiment.

FIG. 9 shows a general configuration of the mobile communication system (a radio communication system) according to the present embodiment.

As well as FIG. 1, there are two states of the radio link without soft handover 102 and the radio link with soft handover 103 between the terminal 100 and the base station 101 and the two states can be switched.

In FIG. 9, transmission quality information 105 is sent from the terminal 100 to the base station 101 instead of a request to switch states with/without soft handover 106 or the moving speed information 104. The transmission quality information is information showing transmission quality (communication quality) of the radio link which is used between the terminal 100 and the base station 101, which corresponds to communication quality information.

Figure 10:
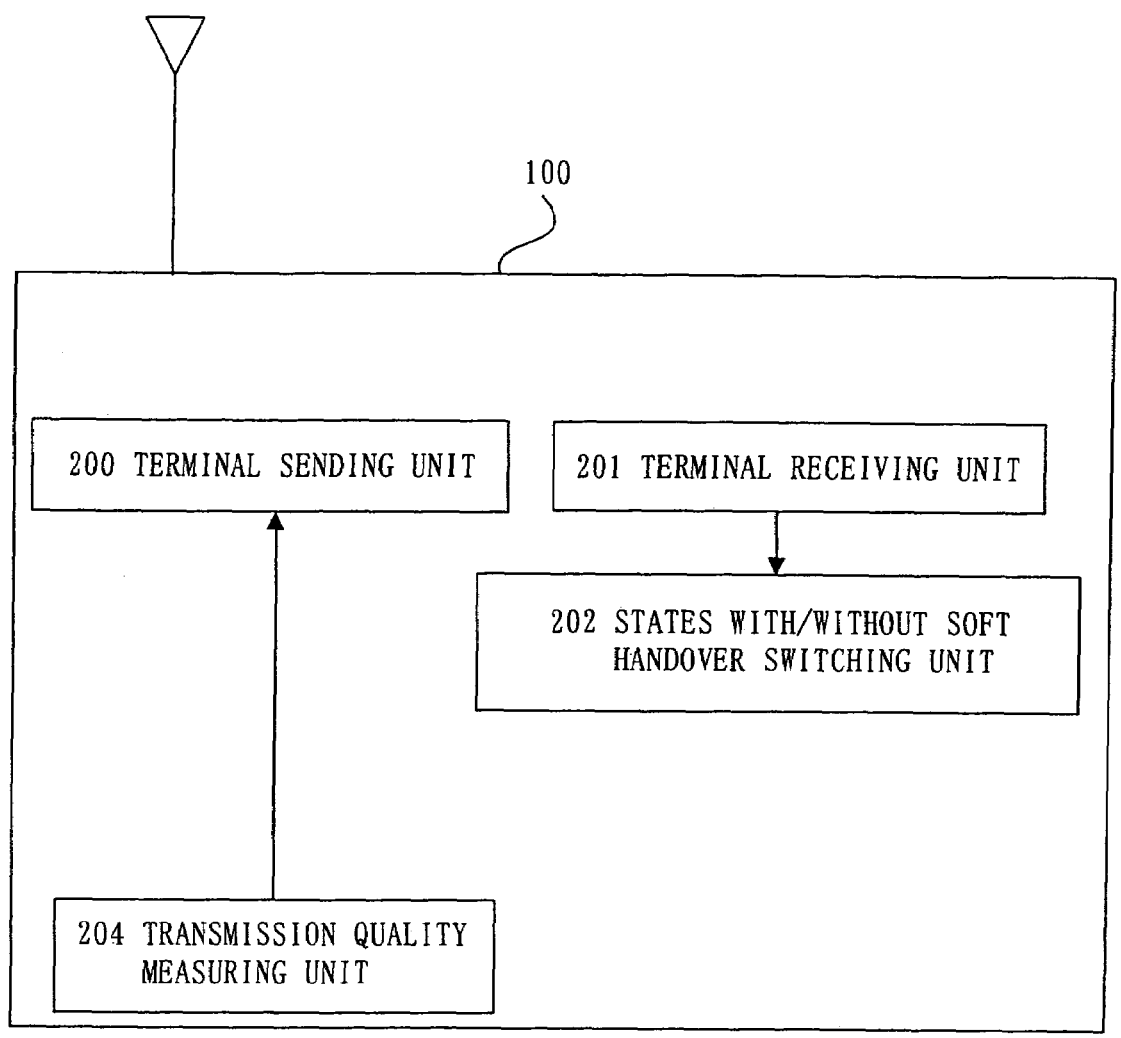
FIG. 10 shows an internal principle diagram of a terminal according to the third embodiment.

FIG. 10 shows an internal principle diagram of the terminal 100 according to the present embodiment.

FIG. 10 has the same configuration as FIG. 6 except that a transmission quality measuring unit is provided instead of the speed detecting unit 205. The transmission quality measuring unit 204 measures the transmission quality (communication quality) of the radio link which is used between the terminal 100 and the base station 101, which corresponds to a communication quality measuring unit.

Figure 11:
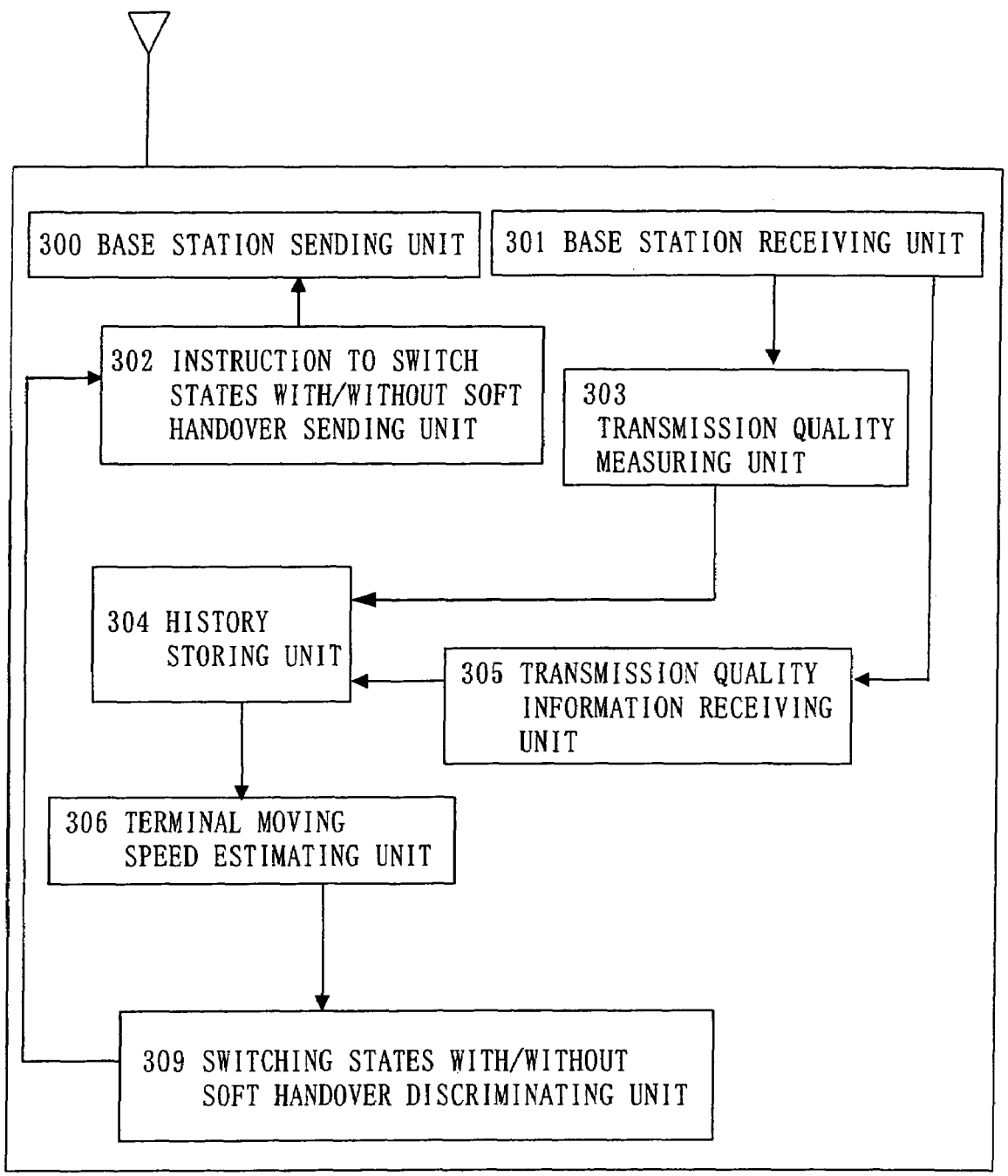
FIG. 11 shows an internal principle diagram of a base station according to the third embodiment.

FIG. 11 shows an internal principle diagram of the base station 101 according to the present embodiment.

In the figure, 300 through 302 and 309 are the same as those of FIG. 3.

The transmission quality measuring unit 303 measures the transmission quality from a received block error rate, etc. A history storing unit 304 stores the quality information, etc. of the past as a history and reads out the history when necessary. A transmission information receiving unit 305 receives the transmission quality information reported from the terminal. A terminal moving speed estimating unit 306 estimates a moving speed of the terminal using the transmission quality information and its history.

In the present embodiment, the instruction to switch states with/without soft handover sending unit 302 corresponds to a switching instruction generating unit, the transmission quality measuring unit 303 corresponds to a communication quality measuring unit, the terminal moving speed estimating unit 306 corresponds to a moving speed estimating unit, and the switching states with/without soft handover discriminating unit 309 corresponds to a switching discriminating unit and a radio link switching unit.

In the present embodiment, the terminal periodically sends the transmission quality information, the base station receives it or carries out the quality measurement by itself, and then the base station estimates the moving speed of the terminal and discriminates switching states with/without soft handover.

A discrimination method and its procedure for switching states with/without soft handover according to this embodiment will be explained.

The terminal measures the transmission quality using the transmission quality measuring unit 204. The terminal sending unit 200 periodically sends the transmission quality information 105 to the base station.

Figure 12:
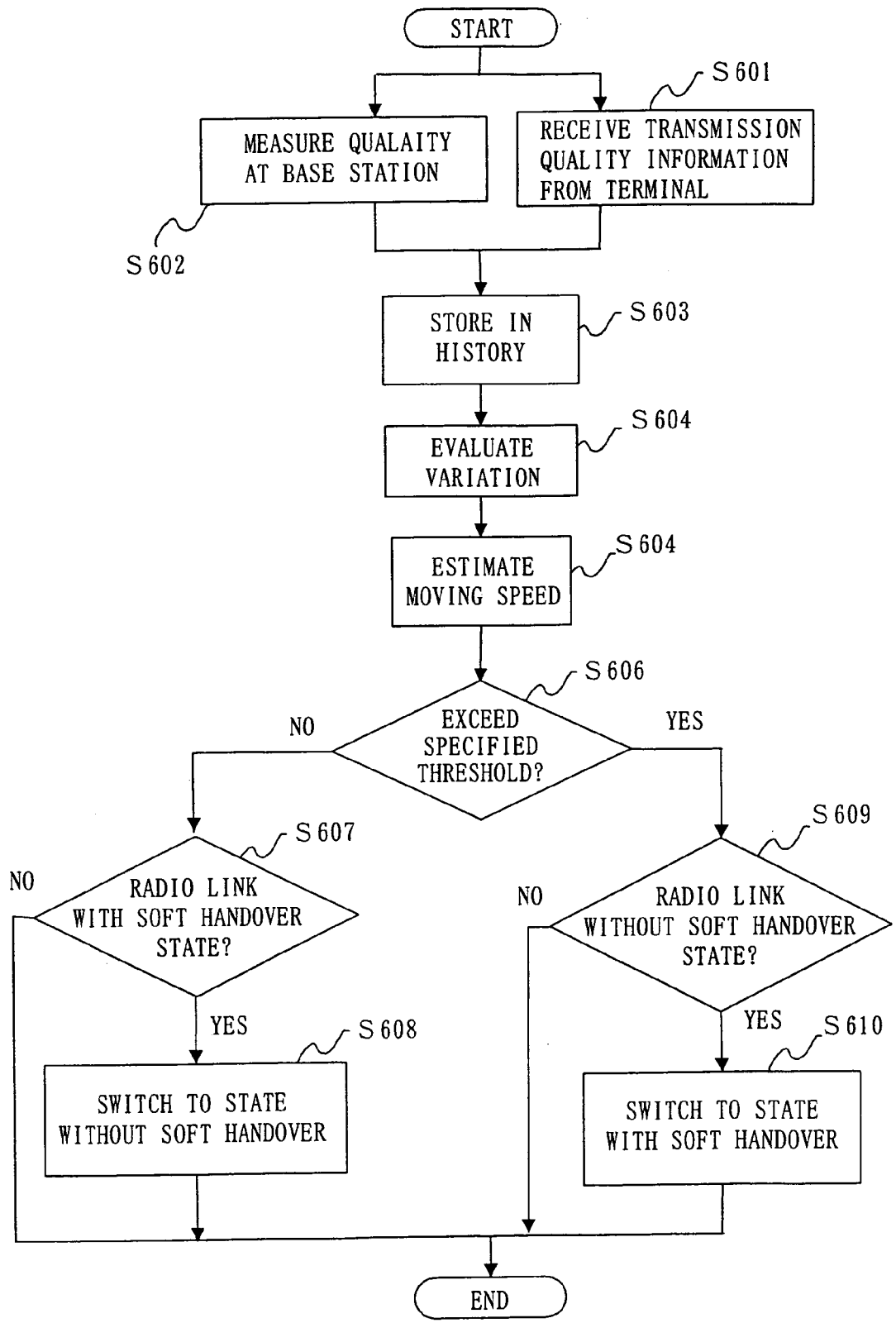
FIG. 12 is a flowchart showing switching process according to the third embodiment.

FIG. 12 is a flowchart showing procedure of the base station according to the present embodiment.

The base station receives the transmission quality information 105 from the terminal by the transmission quality measuring unit 204 at step S601 and stores the information in the history storing unit 304 at step S603.

Further, it is also possible to measure the quality of upstream line by the base station itself at step S602 using the transmission quality measuring unit 303. In this case, the measured quality is also stored in the history sending unit 304 at step S603. Measuring the transmission quality at the base station is an effective method, especially in the case of TDD, etc. in which the upstream line and the downstream line employ the same frequency, since the transmission quality becomes the same between the upstream and the downstream.

The terminal moving speed estimating unit 306 calculates differences of variation of the history at step S604 and evaluates depths of the variation. If a short-term variation is large in the transmission quality, it is judged as movement at a high speed, and the moving speed is estimated so as to correspond to the variation at step S605. In this way, by using the difference in the history of the quality information, it is possible to improve the precision of estimation of the moving speed.

Based on the estimated moving speed, the switching states with/without soft handover discriminating unit 309 compares with the threshold value at step S 606. It is checked if the estimated moving speed of the terminal is faster than the threshold value that has been previously specified. If the estimated moving speed of the terminal is slower than the threshold value (less than the threshold value), the operation proceeds to step S607 and it is checked if the current radio link is the state with soft handover. If it is the state with soft handover, the state is switched to the state without soft handover, the operation proceeds to step S608, and the instruction to switch states with/without soft handover sending unit 302 generates and sends out an instruction to switch to the state without soft handover. If the current radio link is already the state without soft handover, the operation is finished as it is.

If the estimated moving speed of the terminal is faster than the threshold value (equal to or greater than the threshold value), the operation proceeds to step S609 and it is checked if the current radio link is the state with soft handover. If it is the state without soft handover, the state is switched to the state with soft handover, the operation proceeds to step S610, and the instruction to switch states with/without soft handover sending unit 302 generates and sends out an instruction to switch to the state with soft handover. If the current radio link is already the state with soft handover, the operation is finished as it is.

According to the third embodiment, the base station estimates the moving speed based on the transmission quality reported from the terminal or the transmission quality measured by the base station, so that it is possible to switch states with/without soft handover based on the moving speed at the terminal that does not have the speed detecting function.

Here, features of the mobile communication system, the base station, and the terminal that have been explained in the first through third embodiments will be restated in the following.

The mobile communication system explained in the first through third embodiments switches states with/without soft handover based on the moving speed of the terminal or its equivalence.

The terminal explained in the first through third embodiments switches states with/without soft handover based on the moving speed of the terminal or its equivalence in the mobile communication system.

The base station explained in the first through third embodiments switches states with/without soft handover based on the moving speed of the terminal or its equivalence in the mobile communication system.

The terminal shown in the first embodiment, in a process for switching states with/without soft handover based on the moving speed of the terminal or its equivalence in the mobile communication system, detects the moving speed of the terminal itself, discriminates switching states with/without soft handover using the detected speed and sends the switching request to the base station.

The base station shown in the first embodiment, in a process for switching states with/without soft handover based on the moving speed of the terminal or its equivalence in the mobile communication system, makes the terminal detect the moving speed of the terminal itself and discriminate switching states with/without soft handover, receives the request to switch states with/without soft handover, and carries out the switching states with/without soft handover.

The base station shown in the second embodiment, in a process for switching states with/without soft handover based on the moving speed of the terminal or its equivalence in the mobile communication system, receives the moving speed from the terminal, discriminate switching states with/without soft handover using the received speed, and sends out a message to switch states with/without soft handover to the terminal.

The base station shown in the third embodiment, in a process for switching states with/without soft handover based on the moving speed of the terminal or its equivalence in the mobile communication system, receives the transmission quality sent from the terminal, estimates the moving speed of the terminal using the received quality, discriminates switching states with/without soft handover using the estimated speed, and sends out a message to switch states with/without soft handover to the terminal.

The base station shown in the third embodiment, in a process for switching states with/without soft handover based on the moving speed of the terminal or its equivalence in the mobile communication system, measures the transmission quality information, estimates the moving speed of the terminal using the measured information, discriminates switching states with/without soft handover using the estimated speed, and sends out a message to switch states with/without soft handover.

The mobile communication system shown in the first through third embodiments, when the moving speed of the terminal or its equivalence is slower than a certain threshold value and when the current radio link is with soft handover state, determines to switch to the state without soft handover.

The mobile communication system shown in the first through third embodiments, when the moving speed of the terminal or its equivalence is faster than a certain threshold value and when the current radio link is without soft handover state, determines to switch to the state with soft handover.

The mobile communication system shown in the first through third embodiments includes hysteresis in the threshold value when the system discriminates switching states with/without soft handover.

The mobile communication system shown in the third embodiment estimates the moving speed based on differences in the history of the past quality information when the system discriminates switching states with/without soft handover.

The mobile communication system shown in the third embodiment discriminates and carries out the switching states with/without soft handover, considering the quality reported from the terminal or the quality information measured at the base station in addition to the moving speed of the terminal or its equivalence.

The mobile communication system shown in the first through third embodiments switches states with/without soft handover in channels of the same kind.

The mobile communication system shown in the first through third embodiments switches states with/without soft handover by switching to a channel of a different kind.

INDUSTRIAL APPLICABILITY

As has been discussed, according to the present invention, the switching is carried out based on the moving speed of the mobile terminal device. Therefore, when the mobile terminal device is moving at a high speed, it is possible to switch to the radio link adaptive to soft handover in order to secure the quality, and when the mobile terminal device is moving at a low speed or stops, it is possible to switch to the radio link nonadaptive to soft handover in order to save the radio resource.

Further, according to the present invention, the mobile terminal device discriminates necessity of switching the radio links and sends the switching request to the base station device only when the switching is necessary; therefore, it is possible to decrease the upstream communication amount and reduce the interference.

Further, according to the present invention, the base station discriminates necessity of switching the radio links based on the moving speed information of the mobile terminal device; therefore, it is possible to decrease the processing amount of the mobile terminal device.

Yet further, according to the present invention, the base station device estimates the moving speed of the mobile terminal device and carries out the switching the radio links based on the estimated moving speed; therefore, it is possible to properly switch the radio links even if the mobile terminal device does not have a function for detecting the speed.

The invention claimed is:

1. A radio communication system comprising:
a mobile terminal device configured to measure a communication quality of a radio link, which is currently used, and send communication quality information including the measured communication quality to a base station device, said mobile terminal moving at a speed;
the base station device including
a communicating unit configured to receive the communication quality information from the mobile terminal device,
a moving speed estimating unit configured to estimate the moving speed of the mobile terminal device based on the communication quality shown in the communication quality information,
a switching discriminating unit configured to discriminate if it is necessary to switch from the radio link which is currently used to an other radio link based on the moving speed of the mobile terminal device estimated by the moving speed estimating unit,
a radio link switching unit configured to switch the radio link used for the data communication from the radio link which is currently used to the other radio link when the switching discriminating unit discriminates it is necessary to switch from the radio link which is currently used to the other radio link, and
a switching instruction generating unit configured to generate a switching instruction to instruct the mobile terminal device to switch the radio link used for the data communication when the radio link switching unit switches the radio link, and sending the switching instruction generated to the mobile terminal device through the communicating unit; and a plurality of radio links including the radio link which is currently used and the other radio link, said plurality of radio links are configured to communicate between the mobile terminal device and the base station device, wherein at least one of the mobile terminal device or the base station device is configured to select between a soft handover method and a non-soft handover method for handing over said mobile terminal device from the radio link which is currently used to the other radio link based on the moving speed.

2. The radio communication system of claim 1, wherein the mobile terminal device is configured to detect the moving speed of the mobile terminal device itself, and is configured to send moving speed information showing the moving speed detected of the mobile terminal device to the base station device.

3. The radio communication system of claim 2, wherein a radio link adaptive to soft handover which is adaptive to soft handover and a radio link nonadaptive to soft handover which is nonadaptive to soft handover are provided between the base station device and the mobile terminal device as the plurality of radio links, wherein the base station device when the moving speed information is received from the mobile terminal device, is configured to check if the moving speed of the mobile terminal device shown in the moving speed information is equal to or greater than a predetermined threshold value or not, and is configured to discriminate whether the radio link which is currently used is the radio link adaptive to soft handover or the radio link nonadaptive to soft handover;

when the moving speed of the mobile terminal device is equal to or greater than the predetermined threshold value and the radio link which is currently used is the radio link nonadaptive to soft handover, is configured to switch the radio link used for the data communication from the radio link nonadaptive to soft handover to the radio link adaptive to soft handover, and is configured to send a switching instruction to radio link adaptive to soft handover to instruct to switch the radio link used for the data communication from the radio link nonadaptive to soft handover to the radio link adaptive to soft handover to the mobile terminal device; and when the moving speed of the mobile terminal device is less than the predetermined threshold value and the radio link which is currently used is the radio link adaptive to soft handover, is configured to switch the radio link used for the data communication from the radio link adaptive to soft handover to the radio link nonadaptive to soft handover, and is configured to send a switching instruction to radio link nonadaptive to soft handover to instruct to switch the radio link used for the data communication from the radio link adaptive to soft handover to the radio link nonadaptive to soft handover to the mobile terminal device, wherein the mobile terminal device when the switching instruction to radio link adaptive to soft handover is received from the base station device, is configured to switch the radio link used for the data communication from the radio link nonadaptive to soft handover to the radio link adaptive to soft handover; and when the switching instruction to radio link nonadaptive to soft handover is received from the base station device, is configured to switch the radio link used for the data communication from the radio link adaptive to soft handover to the radio link nonadaptive to soft handover.

4. A radio communication system comprising:

a mobile terminal device configured to measure a communication quality of a radio link, which is currently used, and send communication quality information including the measured communication quality to a base station device;

the base station device including a communicating unit configured to receive the communication quality information from the mobile terminal device, a moving speed estimating unit configured to estimate a moving speed of the mobile terminal device based on the communication quality shown in the communication quality information, a switching discriminating unit configured to discriminate if it is necessary to switch from the radio link which is currently used to an other radio link based on the moving speed of the mobile terminal device estimated by the moving speed estimating unit, a radio link switching unit configured to switch the radio link used for the data communication from the radio link which is currently used to the other radio link when the switching discriminating unit discriminates it is necessary to switch from the radio link which is currently used to the other radio link, and a switching instruction generating unit configured to generate a switching instruction to instruct the mobile terminal device to switch the radio link used for the data communication when the radio link switching unit switches the radio link, and sending the switching instruction generated to the mobile terminal device through the communicating unit; and a plurality of radio links including the radio link which is currently used and the other radio link, said plurality of radio links are configured to communicate between the mobile terminal device and the base station device, wherein at least one of the mobile terminal device or the base station device is configured to select between a soft handover method and a non-soft handover method for handing over said mobile terminal device from the radio link which is currently used to the other radio link based on a communication quality of the radio link which is currently used.

5. The radio communication system of claim 4, wherein the base station device is configured to measure the communication quality of the radio link which is currently used;

is configured to estimate a moving speed of the mobile terminal device based on measurement result;

is configured to discriminate if it is necessary to switch from the radio link which is currently used to the other radio link based on the moving speed estimated of the mobile terminal device; and when it is necessary to switch to the other radio link, is configured to switch the radio link used for the data communication from the radio link which is currently used to the other radio link, and is configured to send a switching instruction to instruct to switch the radio link used for the data communication to the mobile terminal device, wherein the mobile terminal device when the switching instruction is received from the base station device, is configured to switch the radio link used for the data communication from the radio link which is currently used to the other radio link.

6. The radio communication system of claim 5, wherein a radio link adaptive to soft handover which is adaptive to soft handover and a radio link nonadaptive to soft handover which is nonadaptive to soft handover are provided between the base station device and the mobile terminal device as the plurality of radio links, wherein when the moving speed of the mobile terminal device is estimated, the base station device is configured to check if the moving speed estimated of the mobile terminal device is equal to or greater than a predetermined threshold value or not, and the base station device is configured to discriminate whether the radio link which is currently used is the radio link adaptive to soft handover or the radio link nonadaptive to soft handover, when the moving speed estimated is equal to or greater than the predetermined threshold value and the radio link which is currently used is the radio link nonadaptive to soft handover, the base station device is configured to switch the radio link used for the data communication from the radio link nonadaptive to soft handover to the radio link adaptive to soft handover, and the base station device is configured to send a switching instruction to radio link adaptive to soft handover to instruct to switch the radio link used for the data communication from the radio link nonadaptive to soft handover to the radio link adaptive to soft handover to the mobile terminal device, and when the moving speed estimated is less than the predetermined threshold value and the radio link which is currently used is the radio link adaptive to soft handover, the base station device is configured to switch the radio link used for the data communication from the radio link adaptive to soft handover to the radio link nonadaptive to soft handover, and the base station device is configured to send a switching instruction to radio link nonadaptive to soft handover to instruct to switch the radio link used for the data communication from the radio link adaptive to soft handover to the radio link nonadaptive to soft handover to the mobile terminal device, wherein when the switching instruction to radio link adaptive to soft handover is received from the base station device, the mobile terminal device is configured to switch the radio link used for the data communication from the radio link nonadaptive to soft handover to the radio link adaptive to soft handover; and when the switching instruction to radio link nonadaptive to soft handover is received from the base station device, the mobile terminal device is configured to switch the radio link used for the data communication from the radio link adaptive to soft handover to the radio link nonadaptive to soft handover.

7. A base station device which carries out data communication with a mobile terminal device, which is configured to measure a communication quality of a radio link, which is currently used, and send communication quality information including the measured communication quality to a base station device, said mobile terminal using one of a plurality of radio links out of the plurality of radio links provided between the base station device and the mobile terminal device, said base station device comprising:

a communicating unit configured to receive the communication quality information from the mobile terminal device, a moving speed estimating unit configured to estimate a moving speed of the mobile terminal device based on the communication quality shown in the communication quality information, a switching discriminating unit configured to discriminate if it is necessary to switch from the radio link which is currently used to an other radio link based on the moving speed of the mobile terminal device estimated by the moving speed estimating unit, a radio link switching unit configured to switch the radio link used for the data communication from the radio link which is currently used to the other radio link when the switching discriminating unit discriminates it is necessary to switch from the radio link which is currently used to the other radio link, and a switching instruction generating unit configured to generate a switching instruction to instruct the mobile terminal device to switch the radio link used for the data communication when the radio link switching unit switches the radio link, and sending the switching instruction generated to the mobile terminal device through the communicating unit; and a handover discriminating unit configured to select between a soft handover method and a non-soft handover method to switch from the radio link which is currently used to the other radio link based on a moving speed of the mobile terminal device.

8. The base station device of claim 7, wherein the mobile terminal device is configured to detect the moving speed of the mobile terminal device itself, and is configured to send moving speed information showing the moving speed detected of the mobile terminal device itself to the base station device, wherein base station device comprises:

the communicating unit is further configured to receive the moving speed information from the mobile terminal device;

the switching discriminating unit is further configured to discriminate if it is necessary to switch from the radio link which is currently used to the other radio link based on the moving speed of the mobile terminal device shown in the moving speed information.

9. A base station device which carries out data communication with a mobile terminal device, which is configured to measure a communication quality of a radio link, which is currently used, and configured to send communication quality information including the measured communication quality to a base station device, said base station device using one of a plurality of radio links out of the plurality of radio links provided between the base station device and the mobile terminal device, said base station device comprising:

a communicating unit configured to receive the communication quality information from the mobile terminal device, a moving speed estimating unit configured to estimate a moving speed of the mobile terminal device based on the communication quality shown in the communication quality information, a switching discriminating unit configured to discriminate if it is necessary to switch from the radio link which is currently used to an other radio link based on the moving speed estimated of the mobile terminal device estimated by the moving speed estimating unit, a radio link switching unit configured to switch the radio link used for the data communication from the radio link which is currently used to the other radio link when the switching discriminating unit discriminates it is necessary to switch from the radio link which is currently used to the other radio link, and a switching instruction generating unit configured to generate a switching instruction to instruct the mobile terminal device to switch the radio link used for the data communication when the radio link switching unit switches the radio link, and sending the switching instruction generated to the mobile terminal device through the communicating unit; and a handover discriminating unit configured to select between a soft handover method and a non-soft handover method to switch from the radio link which is currently used to the other radio link based on a communication quality of the radio link which is currently used.

10. The base station device of claim 9, wherein the base station device comprises:

a communication quality measuring unit for measuring the communication quality of the radio link which is currently used.

11. A mobile terminal device which carries out data communication with a base station device, said base station device having a moving speed estimating unit configured to estimate a moving speed of the mobile terminal device based on the communication quality shown in the communication quality information, a switching discriminating unit configured to discriminate if it is necessary to switch from a radio link which is currently used to an other radio link based on the moving speed estimated of the mobile terminal device estimated by the moving speed estimating unit, a radio link switching unit configured to switch the radio link used for the data communication from the radio link which is currently used to the other radio link when the switching discriminating unit discriminates it is necessary to switch from the radio link which is currently used to the other radio link, and a switching instruction generating unit configured to generate a switching instruction to instruct the mobile terminal device to switch the radio link used for the data communication when the radio link switching unit switches the radio link, and sending the switching instruction generated to the mobile terminal device through the communicating unit, said mobile terminal using one of a plurality of radio links provided between the base station device and the mobile terminal device, said mobile terminal device comprising:

a communicating unit configured to transmit communication quality information to the base station device; and a handover discriminating unit configured to select between a soft handover method and a non-soft handover method to switch from the radio link which is currently used to the other radio link based on a moving speed of the mobile terminal device itself, wherein the mobile terminal device is configured to measure the communication quality of the radio link, which is currently used, and configured to send the communication quality information including the measured communication quality to the base station device.

12. The mobile terminal device of claim 11, wherein the mobile terminal device comprises:

a moving speed detecting unit configured to detect a moving speed of the mobile terminal device itself;

a switching request discriminating unit configured to discriminate if it is necessary to switch from a radio link which is currently used to the other radio link based on the moving speed detected of the mobile terminal device itself by the moving speed detecting unit, and when it is necessary to switch to the other radio link, generating a switching request to request to switch from the radio link which is currently used to the other radio link;

the communicating unit further configured to send the switching request generated by the switching request discriminating unit to the base station device, and receiving a switching instruction to instruct to switch the radio link used for the data communication from the base station device; and a second radio link switching unit configured to switch the radio link used for the data communication from the radio link which is currently used to the other radio link based on the switching instruction received by the communicating unit.

13. A mobile terminal device which carries out data communication with a base station device, said base station device having a moving speed estimating unit configured to estimate a moving speed of the mobile terminal device based on the communication quality shown in the communication quality information, a switching discriminating unit configured to discriminate if it is necessary to switch from the radio link which is currently used to the other radio link based on the moving speed estimated of the mobile terminal device estimated by the moving speed estimating unit, a radio link switching unit configured to switch the radio link used for the data communication from the radio link which is currently used to an other radio link when the switching discriminating unit discriminates it is necessary to switch from the radio link which is currently used to the other radio link, and a switching instruction generating unit configured to generate a switching instruction to instruct the mobile terminal device to switch the radio link used for the data communication when the radio link switching unit switches the radio link, and sending the switching instruction generated to the mobile terminal device through the communicating unit, said mobile terminal device using one of a plurality of radio links provided between the base station device and the mobile terminal device, said mobile terminal device comprising:

a communicating unit for transmitting communication quality information to the base station device; and a handover discriminating unit configured to select between a soft handover method and a non-soft handover method to switch from the radio link which is currently used to the other radio link based on a communication quality of the radio link which is currently used,
wherein the mobile terminal device is configured to measure communication quality of the radio link, which is currently used, and is configured to send the communication quality information including the measured communication quality to the base station device.

14. A radio link switching method for switching from a radio link which is currently used for data communication between a base station device and a mobile terminal device, the method comprising:
   measuring a communication quality of the currently used radio link; sending communication quality information including the measured communication quality to the base station;
   receiving the communication quality information from the mobile terminal device;
   estimating a moving speed of the mobile terminal device based on the communication quality of the communication quality information;
   discriminating whether it is necessary to switch from the currently used radio link to an other radio link based on the moving speed;
   selecting a handover method from a soft handover method and a non-soft handover method based on a moving speed of the mobile terminal;
   switching the radio link used for the data communication from the radio link which is currently used to the other radio link when a switching discriminating unit discriminates it is necessary to switch from the radio link which is currently used to the other radio link;
   generating a switching instruction to instruct the mobile terminal device to switch the radio link used for the data communication when a radio link switching unit switches the radio link; and
   sending the switching instruction to the mobile terminal device.

15. A radio link switching method for switching from a radio link which is currently used for data communication between a base station device and a mobile terminal device, the method comprising:
   measuring a communication quality of the currently used radio link;
   sending communication quality information including the measured communication quality to the base station;
   receiving the communication quality information from the mobile terminal device;
   estimating a moving speed of the mobile terminal device based on the communication quality of the communication quality information;
   discriminating whether it is necessary to switch from the currently used radio link to an other radio link based on the moving speed;
   selecting a handover method from a soft handover method and a non-soft handover method based on the communication quality of the first radio link;
   switching the radio link used for the data communication from the radio link which is currently used to the other radio link when a switching discriminating unit discriminates it is necessary to switch from the radio link which is currently used to the other radio link;
   generating a switching instruction to instruct the mobile terminal device to switch the radio link used for the data communication when a radio link switching unit switches the radio link; and
   sending the switching instruction to the mobile terminal device.

* * * * *